United States Patent [19]

Saito

[11] Patent Number: 4,547,820
[45] Date of Patent: Oct. 15, 1985

[54] FLOPPY DISK DRIVE APPARATUS

[75] Inventor: Shunji Saito, Numazu, Japan

[73] Assignee: Tokyo Electric Co., Ltd., Tokyo, Japan

[21] Appl. No.: 565,919

[22] Filed: Dec. 27, 1983

[30] Foreign Application Priority Data

Jan. 7, 1983 [JP] Japan ............................ 58-818
Jan. 7, 1983 [JP] Japan ............................ 58-819

[51] Int. Cl.[4] ............................................ G11B 19/00
[52] U.S. Cl. .................................................... 360/71
[58] Field of Search ............................... 360/71, 97, 99

[56] References Cited

U.S. PATENT DOCUMENTS 4,318,144 3/1982 Galvagni ............................... 360/99
4,376,293 3/1983 Teramura et al. .................... 360/71

Primary Examiner—George G. Stellar
Attorney, Agent, or Firm—Frishauf, Holtz, Goodman & Woodward

[57] ABSTRACT

A floppy disk drive apparatus includes an index hole sensor, a spindle for holding a floppy disk, and a motor for rotating the spindle. The index hole sensor generates a high-level signal when the floppy disk is set on the spindle. The floppy disk drive apparatus is provided with a motor drive circuit which drives the motor in response to the high-level signal from the index hole sensor.

12 Claims, 13 Drawing Figures

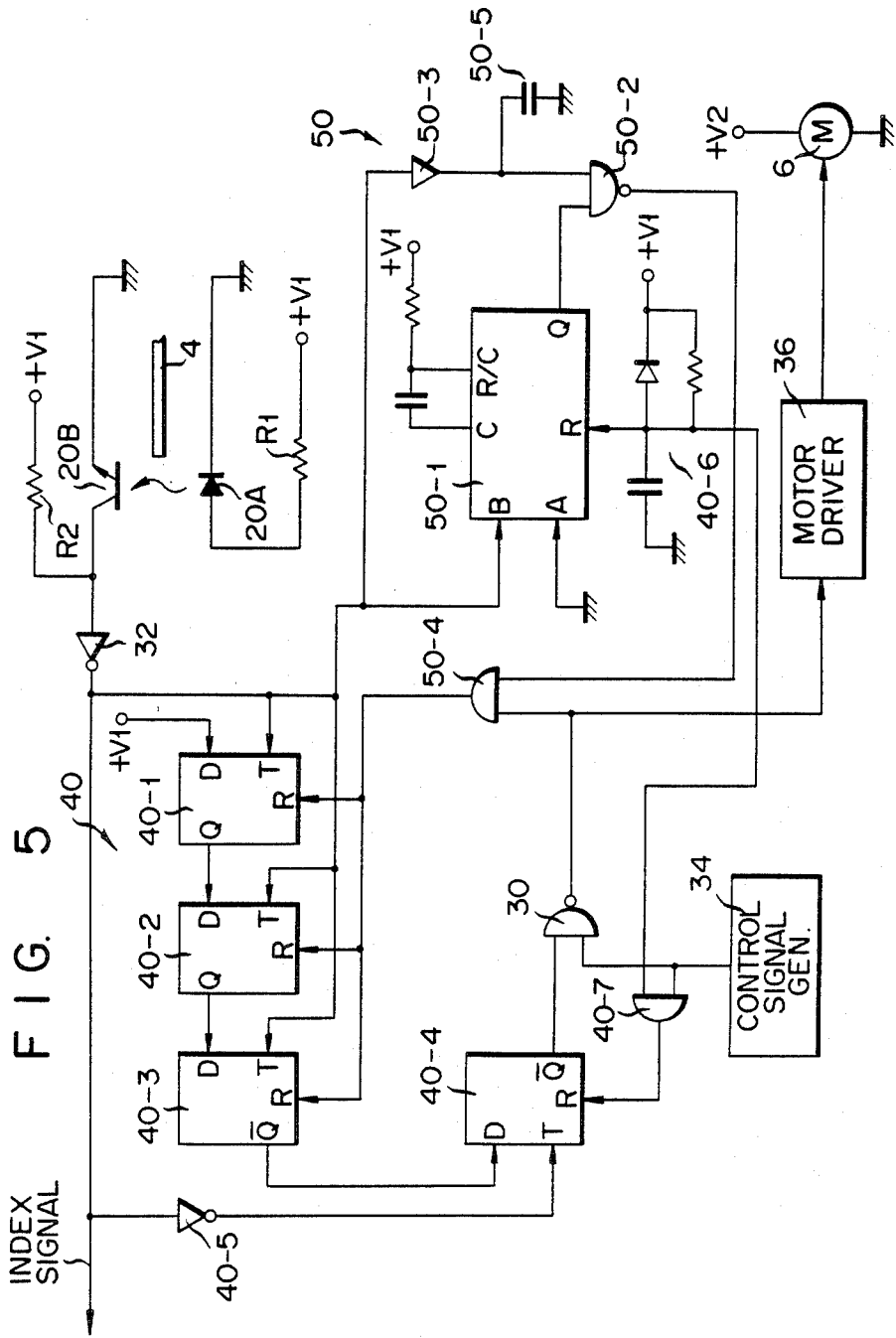
F I G. 5

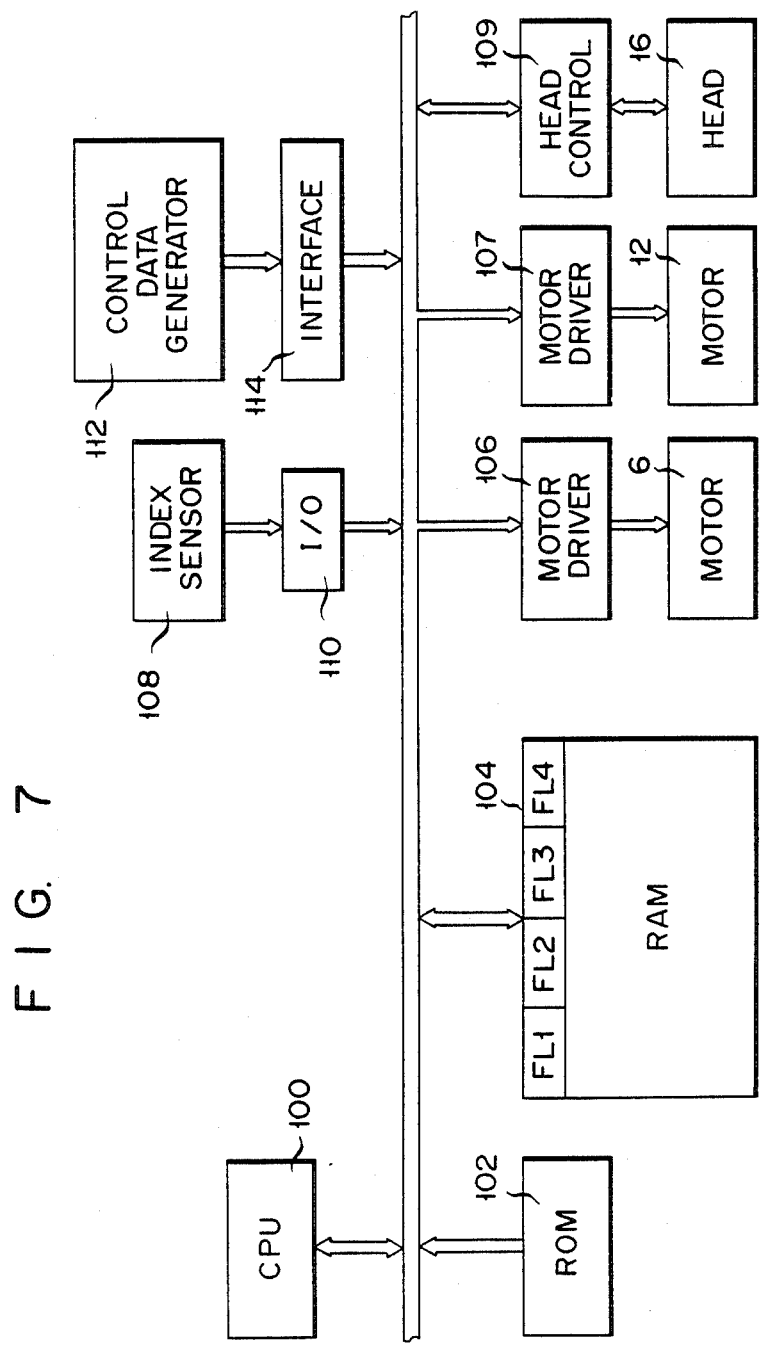
F I G. 7

FLOPPY DISK DRIVE APPARATUS

BACKGROUND OF THE INVENTION

The present invention relates to a floppy disk drive apparatus.

Conventionally known is a floppy disk drive apparatus with a sensor which detects the insertion of a floppy disk, besides an index hole sensor for detecting an index hole of the floppy disk. When the insertion of the floppy disk is detected, the first sensor supplies a drive signal to a motor for rotating a spindle on which the floppy disk is to be fitted, thereby rotating the motor for a fixed period of time. Thus, the floppy disk is securely set on the spindle without a hitch. In the floppy disk drive apparatus of this type, however, the sensor for detecting the insertion of the floppy disk is provided separately from the index hole sensor. Therefore, the apparatus requires a bulkier housing and is increased in manufacturing cost.

SUMMARY OF THE INVENTION

An object of the present invention is to provide a floppy disk drive apparatus in which the insertion of a floppy disk is detected by means of an index hole sensor, and the floppy disk is rotated to be securely fitted on a spindle.

In order to attain the above object, there is provided a floppy disk drive apparatus which comprises an index hole sensor adapted to generate a first output signal when it detects the insertion of the floppy disk, and to generate a second output signal when it detects an index hole of the floppy disk, a spindle for holding the floppy disk, a motor for rotating the spindle, and a motor control circuit for supplying a drive signal to the motor in response to the first output signal from the index hole sensor.

According to the invention, the motor is rotated in response to the first output signal which is generated from the index hole sensor when the insertion of the floppy disk is detected by the sensor, so that it is unnecessary to provide any other sensor for detecting the insertion of the floppy disk.

BRIEF DESCRIPTION OF THE DRAWINGS

FIG. 5 is a circuit diagram of the principal part of a floppy disk drive apparatus according to still another embodiment of the invention;

FIG. 7 is a block diagram of a floppy disk drive apparatus according to a further embodiment of the invention;

DETAILED DESCRIPTION OF THE PREFERRED EMBODIMENTS

Figure 1:
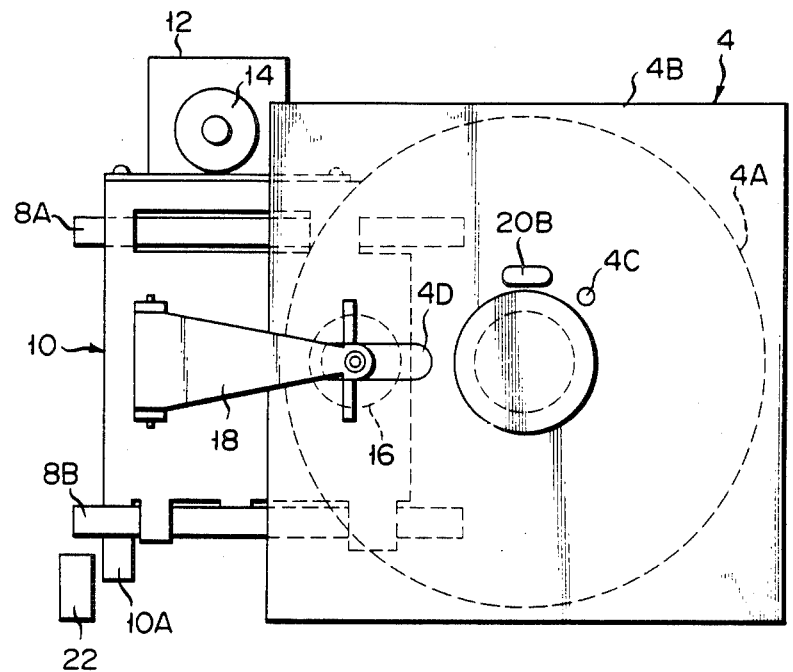
FIGS. 1 and 2 are a top view and a side view, respectively, of a floppy disk drive apparatus according to one embodiment of the present invention.
Figure 2:
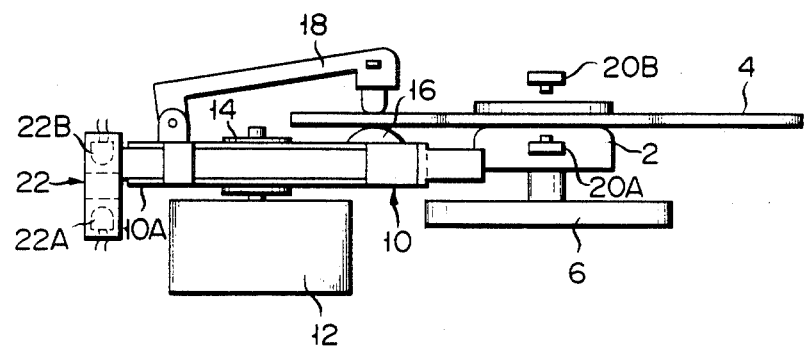

FIGS. 1 and 2 are a top view and a side view, respectively, schematically showing a floppy disk drive apparatus according to one embodiment of the present invention. The floppy disk drive apparatus comprises a spindle 2 for holding a floppy disk 4, a motor 6 for rotating the spindle 2, two fixed shafts 8A and 8B, a head carrier 10 slidably mounted on the shafts 8A and 8B, and a motor 12 for driving the head carrier 10 along the shafts 8A and 8B with the aid of a pulley 14. The floppy disk 4 includes a disk medium 4A and a case 4B containing the disk medium 4A therein. An index hole 4C is formed in the floppy disk 4, and a slot 4D is formed in the case 4B, extending in the radial direction of the disk medium 4A. The head carrier 10 is mounted with a magnetic head 16 and a press member 18 for pressing the disk medium 4A against the magnetic head 16 through the slot 4D. The floppy disk drive apparatus further comprises an index sensor, having a light emitting diode 20A and a phototransistor 20B, whereby an output signal is generated when the index hole 4C of the floppy disk 4 is detected, and an outer limited position detector 22 including a light emitting diode 22A and a phototransistor 22B to detect the outer limited position of the floppy disk by detecting a projecting portion 10A of the carrier 10.

Figure 3:
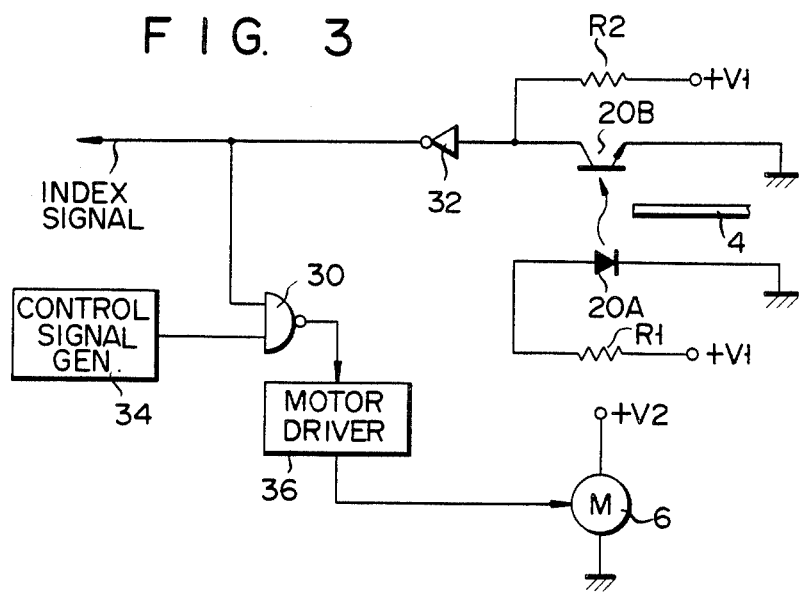
FIG. 3 is a circuit diagram of the principal part of the floppy disk drive apparatus according to one embodiment of the invention.

FIG. 3 shows a circuit in the principal part of the floppy disk drive apparatus according to one embodiment of the invention. In this circuit, the light emitting diode 20A has its cathode grounded and its anode connected to a power source terminal +V1 through a resistor R1, and the phototransistor 20B is formed of an npn transistor whose emitter is grounded and whose collector is connected to the power source terminal +V1 through a resistor R2. The collector of the phototransistor 20B is connected through an inverter 32 to one input terminal of a NAND gate 30 the other input terminal of which is coupled to a control signal generator 34 for generating a motor control signal. The output terminal of the NAND gate 30 is connected to a motor drive 36 for driving the motor 6.

Normally, a current is supplied to the light emitting diode 20A, and a light from the light emitting diode 20A is applied to the base of the phototransistor 20B, rendering the phototransistor 20B conductive. In this state, a signal "1" is supplied to the NAND gate 30 through the inverter 32. In this case, if a control signal "1" is being generated from the control signal generator 34, a "0"-level signal is generated from the NAND gate 30, so that the motor driver 36 is inhibited from driving the motor 6. When the floppy disk 4 is set on the spindle 2, the light from the light emitting diode 20A to the phototransistor 20B is intercepted, so that the phototransistor 20B is rendered nonconductive. As a result, a signal "0" is supplied to the NAND gate 30 through the inverter 32, and a "1"-level signal is supplied from the NAND gate 30 to the motor driver 36. Thereupon, a motor drive signal is supplied from the motor driver 36 to the motor 6 to drive the same. Thus, the spindle 2 rotates, and the floppy disk 4 is also rotated and securely fitted on the spindle 2. If the index hole 4C of the rotating floppy disk 4 is detected by the index sensor, that is, if the light from the light emitting diode 20A is applied to the base of the phototransistor 20B through the index hole 4C, then the phototransistor 20B is rendered conductive and a signal "1" is supplied, after inverted by the inverter 32, to the NAND gate 30, thereby stopping the operation of the motor driver 32. As a result, the motor 6 and hence the floppy disk 4 cease to rotate.

Thereafter, when a control signal "0" is generated from the control signal generator 34, a signal "1" is supplied from the NAND gate 30 to the motor driver 36 to drive the motor 6. In this case, a "1"-level signal is generated as an index signal from the inverter 32 every time the index hole 4C of the rotating floppy disk 4 is detected by the index sensor.

Thus, in the present embodiment, the index sensor controls the rotation of the motor 6 in setting the floppy disk 4, and also detects the index hole 4C to generate an index signal while the motor 6 is being rotated in response to a control signal from the control signal generator 34.

Figure 4:
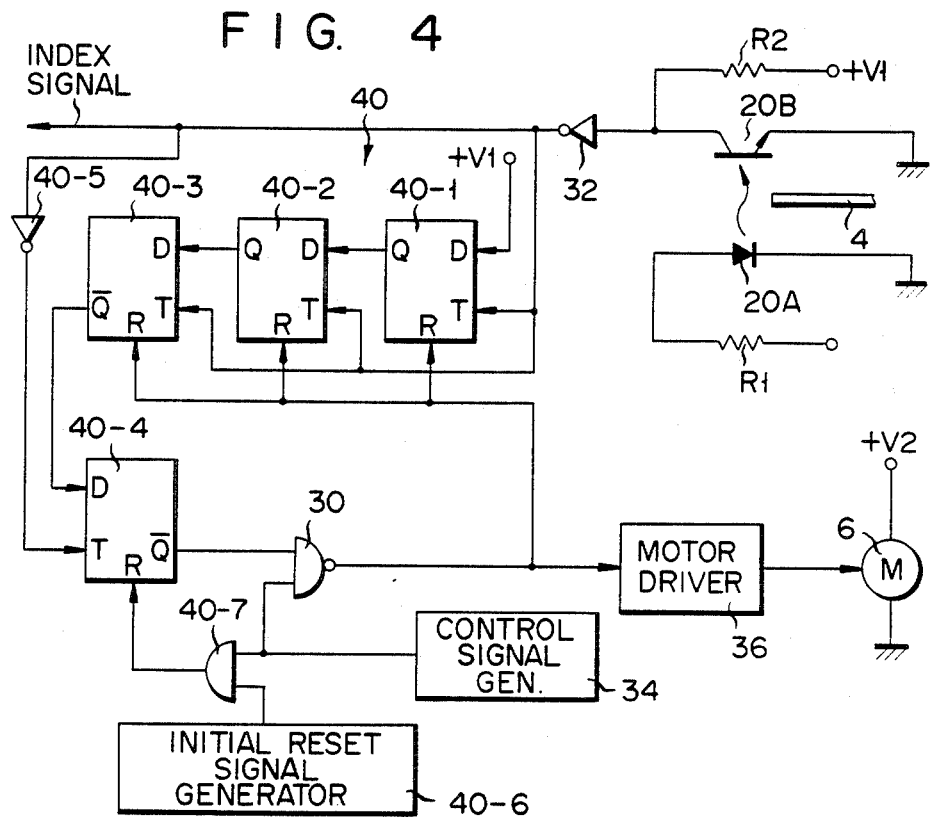
FIG. 4 is a circuit diagram of the principal part of a floppy disk drive apparatus according to another embodiment of the invention.

FIG. 4 shows a circuit in the principal part of a floppy disk drive apparatus according to another embodiment of the invention. This circuit is arranged in substantially the same manner as the one shown in FIG. 3 except that it includes a control circuit 40 for controlling the NAND gate 30 in response to a signal generated via the inverter 32. The control circuit 40 comprises three cascade-connected D-type flip-flops 40-1, 40-2 and 40-3, a D-type flip-flop 40-4 whose trigger terminal is connected to the inverter 32 through an inverter 40-5 and whose D input terminal is connected to the Q output terminal of the flip-flop 40-3, and an initial reset signal generator 40-6 which supplies an initial reset signal to the reset terminal of the flip-flop 40-4 through one input terminal of an AND gate 40-7. The output terminal of the control signal generator 34 is connected to the other input terminal of the AND gate 40-7, and the $\overline{Q}$ output terminal of the flip-flop 40-4 is connected to one input terminal of the NAND gate 30 the other input terminal of which is coupled to the output terminal of the control signal generator 34. The output terminal of the NAND gate 30 is connected to the motor driver 36, and also to the reset terminals of the flip-flops 40-1 to 40-3. The output signal of the inverter 32 is supplied to the trigger terminals of the flip-flops 40-1 to 40-3.

If a power switch (not shown) is turned on to apply operating voltage to the power source terminals +V1 and +V2, then a low-level signal is generated from the initial reset signal generator 40-6 for a predetermined period of time to reset the flip-flop 40-4. In this case, the flip-flops 40-1 to 40-3 are held set. In this situation, a high level $\overline{Q}$ output signal is generated from the flip-flop 40-4. Therefore, if a high-level signal is generated from the control signal generator 34, a signal "0" is generated from the NAND gate 30. As a result, the flip-flops 40-1 to 40-3 are reset, and the motor driver 36 is held nonoperative.

Subsequently, when the floppy disk 4 is set on the spindle 2, the phototransistor 20B is cut off, and the output signals of the inverters 32 and 40-5 become low and high, respectively. Accordingly, the flip-flop 40-4 is set in the "1" output state, so that a low-level $\overline{Q}$ output signal is generated from the flip-flop 40-4. Thereupon, a signal "1" is generated from the NAND gate 30, actuating the motor driver 36 to rotate the motor 6. Thus, as the motor 6 rotates, the floppy disk 4 is rotated. If the index hole 4C of the floppy disk 4 is detected by the index sensor, the phototransistor 20B is rendered conductive, and the output signals of the inverters 32 and 40-5 become high and low, respectively. As a result, the flip-flop 40-1 is set into the "1" output state, while the output states of the other flip-flops are kept unchanged. If the index hole 4C is detected again after the floppy disk 4 rotates additionally, the flip-flops 40-1 and 40-2 are set to the "1" output state in response to the output signal of the inverter 32. Thereafter, if the index hole 40C is detected again so that a high-level signal is generated from the inverter 32, then the flip-flops 40-1 to 40-3 are all set to the "1" output state. Thereafter, when the floppy disk 40 further rotates to intercept the light beam from the light emitting diode 20A, the phototransistor 20B is cut off, and a high-level signal is generated from the inverter 40-5. Hereupon, the flip-flop 40-3 is set to the "1" output state, and a low-level signal is supplied to the D input terminal of the flip-flop 40-4, so that the flip-flop 40-4 is set to the "0" output state in response to the high-level signal from the inverter 40-5. As a result, a high-level $\overline{Q}$ output signal is generated from the flip-flop 40-4, so that a "0"-level signal is generated from the NAND gate 30. Thus, the motor driver 36 is rendered nonoperative, and the flip-flops 40-1 to 40-3 are reset.

Thereafter, when a control signal "0" is generated from the control signal generator 34, a "1"-level signal is generated from the NAND gate 30, and the motor driver 36 drives the motor 6. In this case, "1"-level signal is generated as an index signal from the inverter 32 every time the index hole 4C of the rotating floppy disk 4 is detected by the index sensor.

FIG. 5 shows a circuit in the principal part of a floppy disk drive apparatus according to still another embodiment of the invention. This circuit is arranged in substantially the same manner as the one shown in FIG. 4 except that it further includes a control circuit 50. The control circuit 50 comprises a monostable multivibrator 50-1 whose B input terminal is connected to the inverter 32 and whose reset terminal is connected to the initial reset signal generator 40-6, a NAND gate 50-2 one input terminal of which is connected to the inverter 32 through a buffer 50-3 and the other input terminal of which is connected to the Q output terminal of the monostable multivibrator 50-1, and an AND gate 50-4 having two input terminals connected respectively to the NAND gates 30 and 50-2 and an output terminal connected to the reset terminals of the flip-flops 40-1 to 40-3. The output terminal of the buffer 50-3 is grounded through a capacitor 50-5. The monostable multivibrator 50-1 is triggered in response to the rise of a signal applied to its B input terminal, and generates a high-level signal from its $\overline{Q}$ output terminal after the elapse of a time T which is longer than the time required for one rotation of the floppy disk 4.

The monostable multivibrator 50-1 is reset in an initial state by the initial reset signal generator 40-6, and generates a low-level signal from its $\overline{Q}$ output terminal. Also, the monostable multivibrator 50-1 is triggered by the output signal of the inverter 32 every time the index hole 4C is detected. When the floppy disk 4 is rotating normally, the index hole 4C is detected before the output state of the monostable multivibrator 50-1 is changed. Therefore, the monostable multivibrator 50-1 is re-triggered. Thus, the monostable multivibrator 50-1 continuously generates a low-level signal. In the initial state, therefore, the circuit shown in FIG. 5 operates in the same manner as the one shown in FIG. 4. Namely, when the floppy disk 4 is set on the spindle 2, it is rotated, and the flip-flops 40-1 to 40-3 are successively set to the "1" output state every time the index hole 4C is detected. Assume now, for example, that the floppy disk 4 is removed after the flip-flop 40-1 is set to the "1" output state. In this case, the phototransistor 20B is rendered conductive, and a high-level signal is generated from the inverter 32, so that the flip-flop 40-2 is set to "1", and the monostable multivibrator 50-1 is re-triggered. After the elapse of the predetermined time T, the output state of the monostable multivibrator 50-1 is changed, and a "1"-level signal is generated from its $\bar{Q}$ output terminal. Thereupon, a "0"-level signal is generated from the NAND gate 50-2, so that a "0"-level signal is generated from the AND gate 50-4 to reset the flip-flops 40-1 to 40-3. Thus, in this embodiment, the flip-flops 40-1 to 40-3 are reset whenever the floppy disk 4 is removed.

Figure 6:
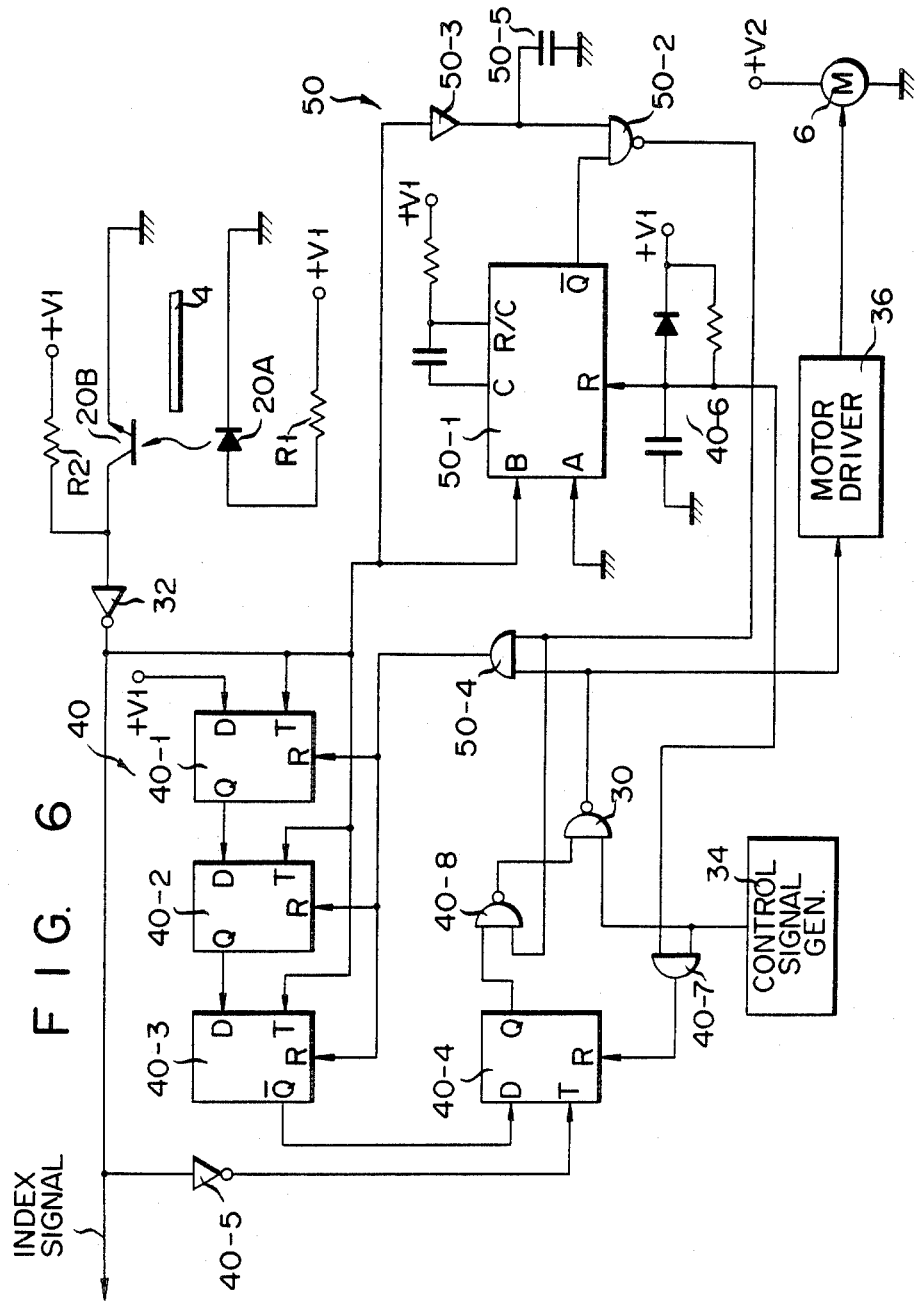
FIG. 6 is a modification of the circuit shown in FIG. 5.

FIG. 6 shows a modification of the circuit shown in FIG. 5. This circuit is arranged in the same manner as the one shown in FIG. 5 except that the one input terminal of the NAND gate 30 is connected not to the $\bar{Q}$ output terminal of the flip-flop 40-4, but to a NAND gate 40-8. Two input terminals of the NAND gate 40-8 are connected respectively to the Q output terminal of the flip-flop 40-4 and the output terminal of the NAND gate 50-2.

If the floppy disk 4 is removed after it is rotated so that the flip-flop 40-1 is set to the "1" output state, then the monostable multivibrator 50-1 is retriggered in the aforesaid manner. Thereafter, when a "0"-level signal is generated from the NAND gate 50-2 after the elapse of the predetermined time T, "1"-and "0"-level signals are generated from the NAND gate 40-8 and the AND gate 50-4, respectively. As a result, the flip-flops 40-1 to 40-3 are reset, and a "0"-level signal is generated from the NAND gate 30 to stop the motor drive.

FIG. 7 is a block diagram of the principal part of a floppy disk drive apparatus according to a further embodiment of the invention. This floppy disk drive apparatus comprises a central processing unit (CPU) 100, a read-only memory (ROM) 102 and a random access memory (RAM) 104 connected to the CPU 100 by means of data buses, motor drivers 106 and 107 for driving the motors 6 and 12, respectively, an index sensor 108 connected to an I/O port 110, a head control 109 for executing data read/write processing for the head 16, and a control data generator 112 connected to the CPU 100 through an interface 114. The RAM 104 has flag memory areas FL1 to FL4. The index sensor 108 is formed of the light emitting diode 20A and the phototransistor 20B. The control data generator 112 generates control data including a read/write signal, write inhibit signal, drive select signal, step signal, motor control signal, etc. in response to an output signal from, e.g., an external keyboard circuit (not shown).

Figure 8:
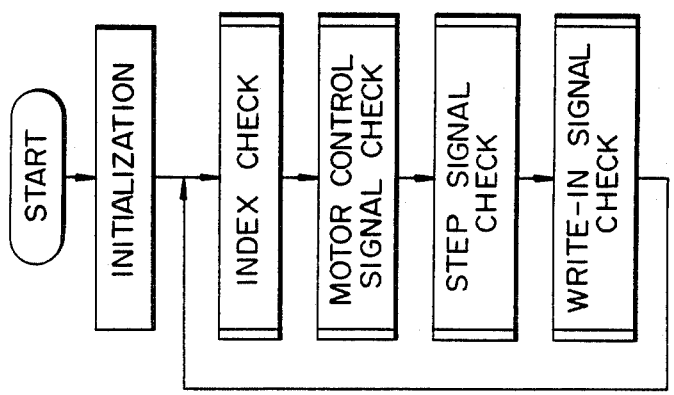
FIG. 8 is a flow chart of a main routine executed by a CPU shown in FIG. 7.

After the power source is turned on, the CPU 100 executes a main routine as shown in FIG. 8. Namely, the CPU 100 repeatedly executes subroutines for an index check, motor drive signal check, step signal check, and write-in signal check after executing initialization processing including clearing of the contents of the RAM 104.

Figure 9:
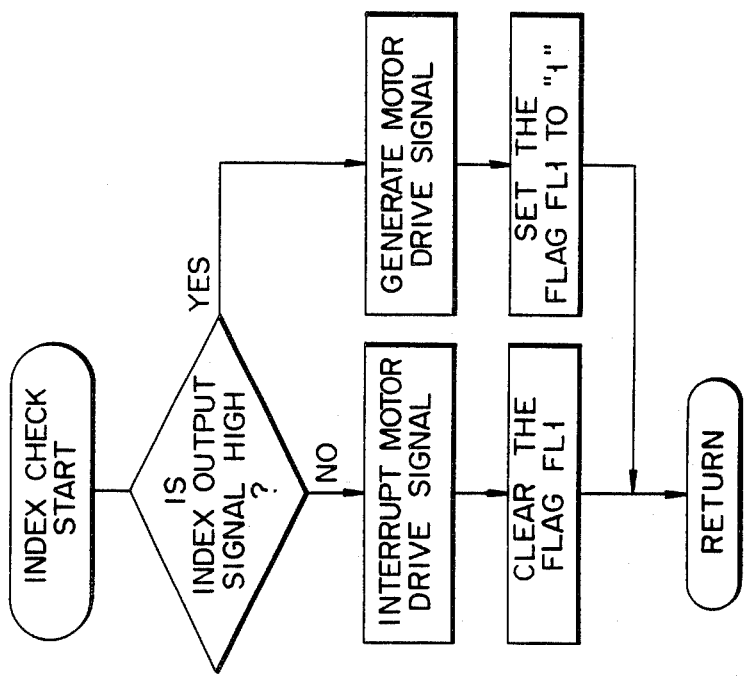
FIG. 9 is a flow chart showing an example of a subroutine for an index check included in the main routine shown in FIG. 8.

FIG. 9 is a flow chart showing an index check subroutine for executing the similar motor control attained by the circuit shown in FIG. 3. In this subroutine, the CPU 100 checks to see if the level of the index output signal from the index sensor 108 is high, that is, if the phototransistor 20B is set nonconductive. If generation of a high-level index output signal from the index sensor 108 is detected, that is, if the phototransistor 20B is found to be nonconductive, then the CPU 100 supplies a motor drive signal to the motor driver 106 to drive the motor 6, and writes data "1" in the flag memory area FL1. If it is detected that the level of the index output signal from the index sensor 108 is low, the CPU 100 ceases to generate the motor drive signal, and writes data "0" in the flag memory area FL1.

When the index check subroutine is ended in this manner, the subroutine for the motor control signal check is started. In this subroutine, the CPU 100 generates a motor drive signal to rotate the motor 6 and writes data "1" in the flag memory area FL2 when it detects generation of a low-level motor control signal from the control data generator 112.

Subsequently, in the subroutine for the step signal check, when the CPU detects generation of a step signal from the control data generator 112, it supplies the motor driver 107 with a motor drive signal corresponding to the step signal to rotate the motor 12, thereby moving the head 16 to a desired track position on the floppy disk 4.

In the next subroutine for the write-in signal check, when the CPU 100 detects generation of a write-in signal from the control data generator 112, it supplies a write-in instruction signal to the head control 109, and writes data produced from outside or from the control data generator 112 in the floppy disk 4 by means of the head 16.

When processing of a cycle of subroutines is completed in this manner, the index check subroutine is started again.

Figure 10:
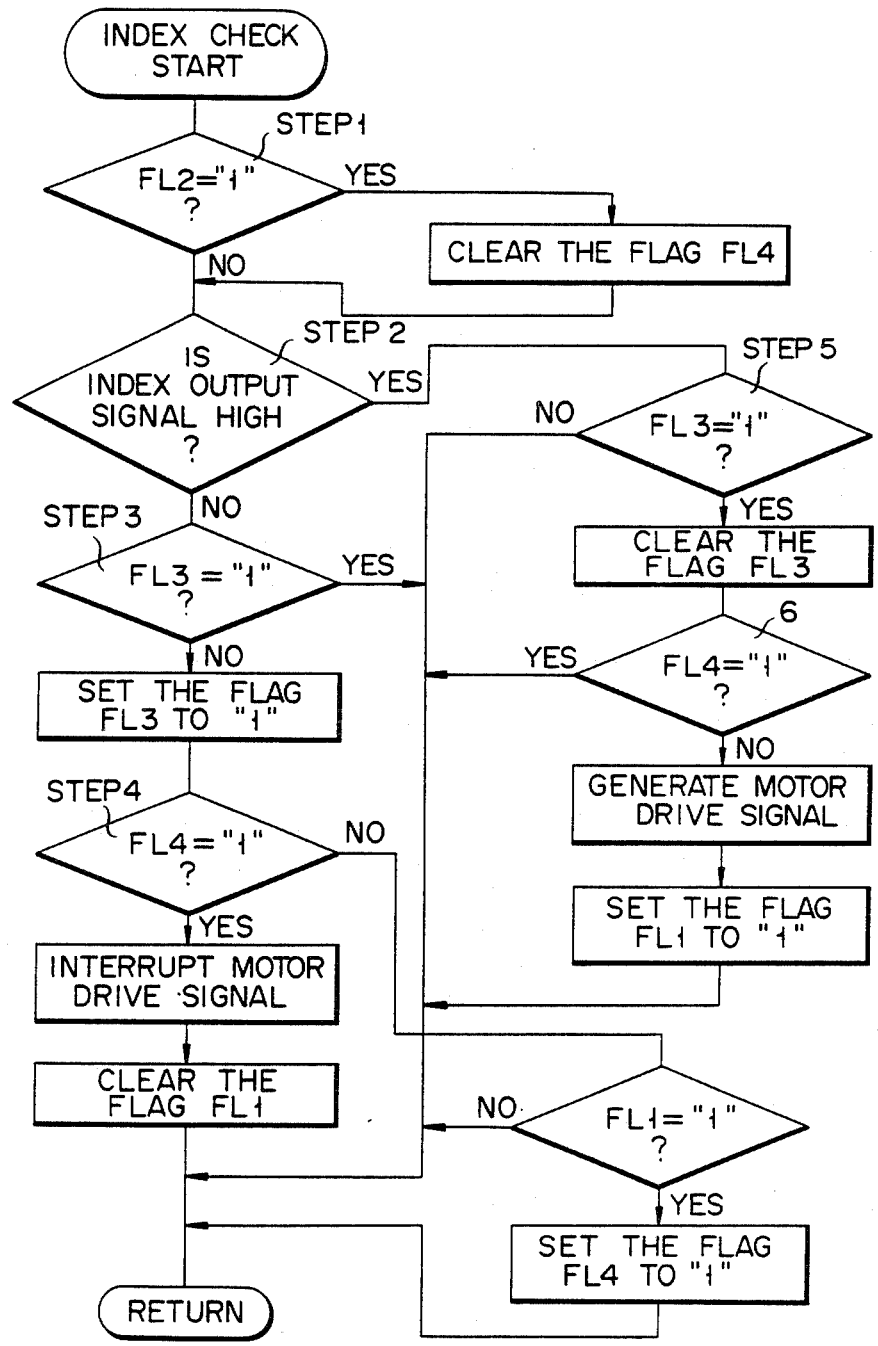
FIG. 10 is a flow chart showing another example of the subroutine for the index check included in the main routine shown in FIG. 8.

FIG. 10 is a flow chart showing an index check subroutine for executing the similar motor control attained in the circuit shown in FIG. 4. For example, the CPU 100 checks, in STEP 1, the content of the flag memory area FL2 in which data "1" is written when a low-level motor control signal is generated from the control data generator 112. If the content of the flag memory area FL2 is "1", data "0" is written in the flag memory area FL4. Then, in STEP 2, the CPU 100 checks to see if the level of the index output signal from the index sensor 108 is high. STEP 2 is also executed if it is detected that the content of the flag memory area FL2 is "0". If the level of the index output signal is found to be low, the content of the flag memory area FL3 is checked in STEP 3. If it is then detected that the content of the memory area FL3 is "1", the processing routine proceeds to the subroutine for the motor control signal check shown in FIG. 8. If it is detected in STEP 3 that the content of the flag memory area FL3 is "0", data "1" is written in the memory area FL3, and then the content of the flag memory area FL4 is checked in STEP 4. If it is then detected that data "1" is stored in the flag memory area FL4, the generation of the motor drive signal is interrupted, and data "0" is written in the flag memory area FL1. Thus, the index check subroutine is ended. If storage of data "0" in the flag memory area FL4 is detected in STEP 4, the content of the flag memory area FL1 is checked. The index check subroutine is ended when storage of data "0" in the flag memory area FL1 is detected, or after data "1" is written in the flag memory area FL4 if storage of data "1" in the memory area FL1 is detected.

If the level of the index output signal is found to be high in STEP 2, the content of the flag memory area FL3 is checked in STEP 5. If storage of data "0" in the memory area FL3 is detected, the index check subroutine is ended. If storage of data "1" in the memory area FL3 is detected in STEP 5, data "0" is written in the memory area FL3, and then the content of the flag memory area FL4 is checked in STEP 6. If storage of data "1" in the flag memory area FL4 is detected, the index check subroutine is ended. If storage of data "0" in the flag memory area FL4 is detected, the index check subroutine is ended when a motor drive signal is generated and data "0" is written in the flag memory area FL1.

In the initial state, the contents of the flag memory areas FL1 to FL4 are all "0". If the subroutine for the index check is executed at least once in this state, data "1" is written in the memory area FL3. When the floppy disk 4 is then set on the spindle 2, it is detected in STEP 2 that the level of the index output signal is high. Thereafter, the CPU 100 writes data "0" in the flag memory area FL3, and further supplies a motor drive signal to the motor driver 106 to rotate the motor 6. At the same time, the CPU 100 writes data "1" in the flag memory area FL1, and thus the index check subroutine for the current cycle is ended. As long as the high-level index output signal is generated from the index sensor 108, the index check subroutine for each subsequent cycle is ended after STEP's 1, 2 and 5 are executed. Thus, when the index hole 4C of the floppy disk 4 is detected and if generation of a low-level index output signal from the index sensor 108 is detected in STEP 2, the CPU 100 executes STEP 3, and writes data "1" in the flag memory area FL3. Then, it executes STEP 4, and writes data "1" in the flag memory area FL4. Thus, the index check subroutine is ended. Thereafter, if generation of a high-level index output signal from the index sensor 108 is detected as the floppy disk 4 rotates, STEP 5 is executed, and then the content of the flag memory area FL3 is cleared. Thereafter, if the index hole 4C is detected again as the floppy disk 4 rotates further, the CPU 100 executes STEP 3, and writes data "1" in the flag memory area FL3. Thereafter, it executes STEP 4, interrupts the generation of the motor drive signal, and clears the contents of the flag memory area FL1.

Thus, according to this embodiment, the floppy disk 4 is rotated when it is set on the spindle 2. When the index hole 4C is detected twice, the rotation of the floppy disk 4 is interrupted. Thus, the floppy disk 4 can securely be held on the spindle 2.

Figure 11:
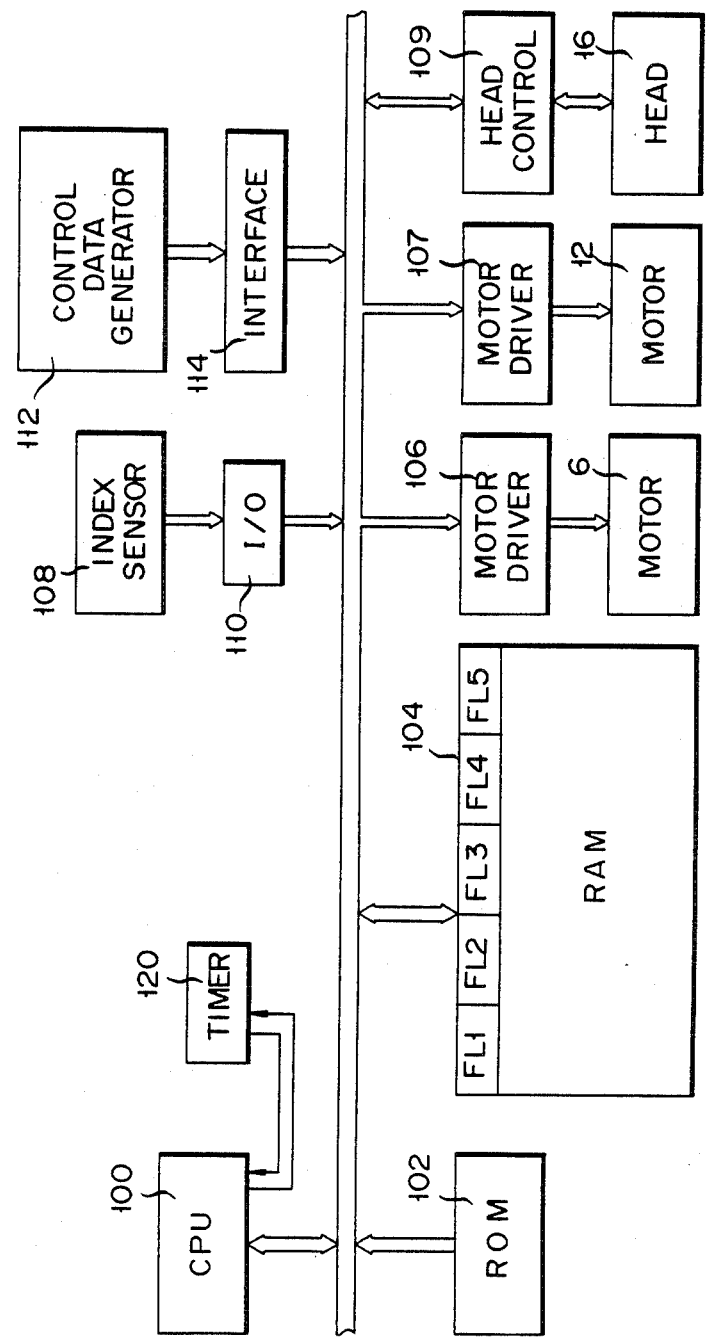
FIG. 11 is a block diagram of a floppy disk drive apparatus according to a still further embodiment of the invention.
Figure 12:
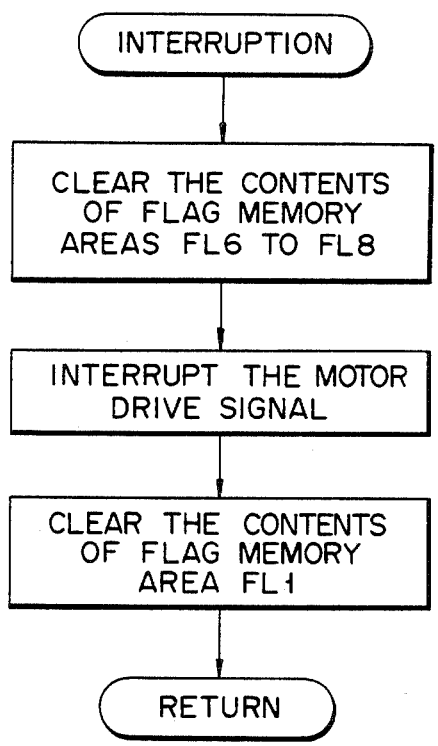
FIG. 12 is a flow chart of an interruption subroutine executed by a CPU shown in FIG. 11.

FIG. 11 is a block diagram of the principal part of a floppy disk drive apparatus according to a further embodiment of the invention. This floppy disk drive apparatus is constructed in the same manner as the one shown in FIG. 7 except that flag memory areas FL5 to FL8, instead of the flag memory areas FL2 to FL4, are arranged in the RAM 104, and that a re-triggerable timer circuit 120 is further connected to the CPU 100. The timer circuit 120 is triggered in response to the trigger signal from the CPU 100, and supplies an interrupt signal to the CPU 100 after counting the time T longer than the time required for one rotation of the floppy disk 4. However, the timer circuit 120 restarts to count the time T when it is re-triggered by the trigger signal from the CPU 100 before completing the counting operation of the time T. As shown in FIG. 12, the CPU 100 clears the contents of the flag memory areas FL6 to FL8 in response to the interruption signal from the timer circuit 120, ceases to generate the motor drive signal, and clears the content of the flag memory area FL1, and then returns the processing routine to the main routine which has been interrupted. The CPU 100 executes the same main routine shown in FIG. 8.

Figure 13:
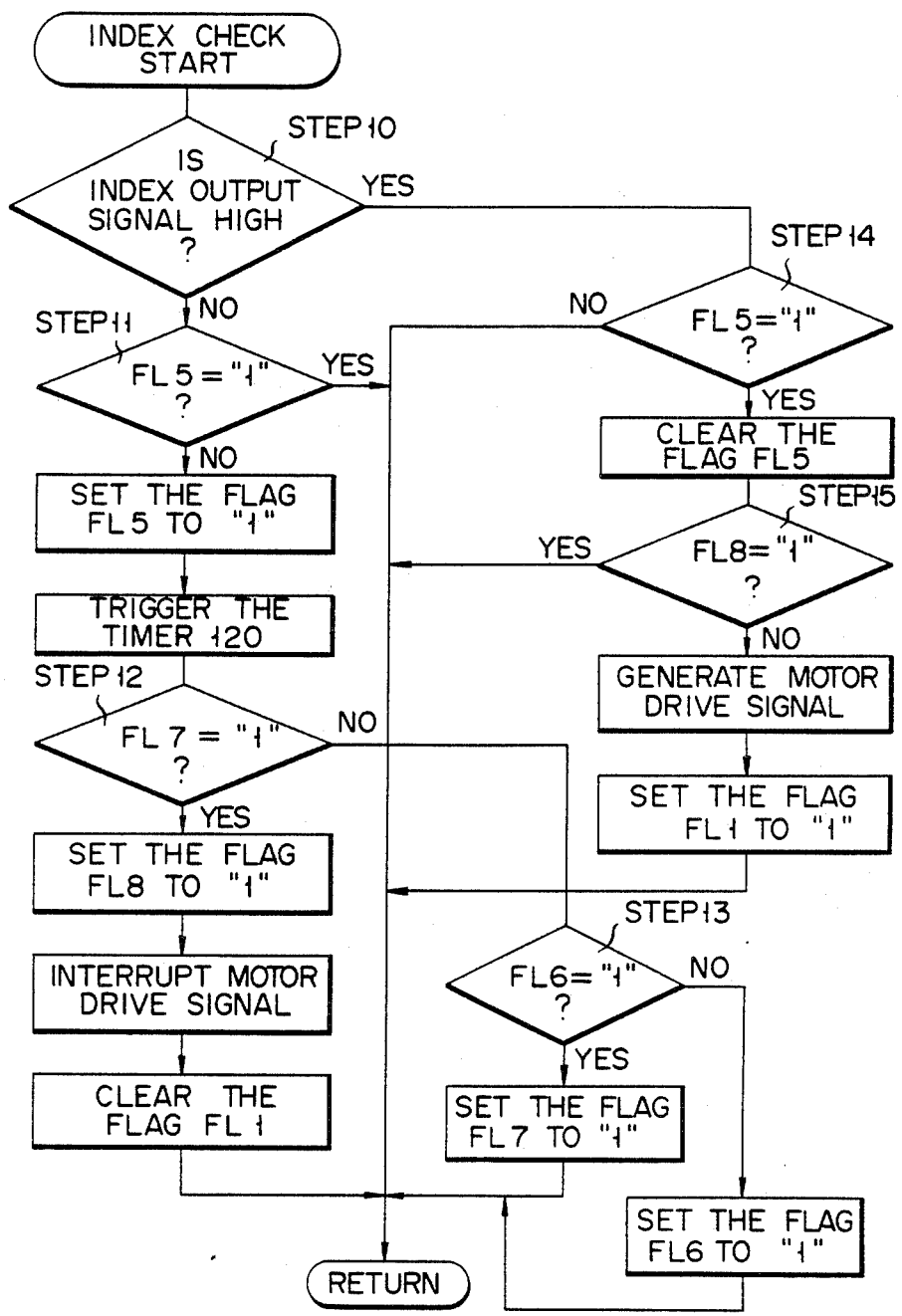
FIG. 13 is a flow chart of an example of a subroutine for an index check executed by the CPU shown in FIG. 11.

FIG. 13 is a flow chart showing an index check subroutine executed by the CPU 100. First, in STEP 10, the CPU 100 checks to see if the level of the index output signal from the index sensor 108 is high. If the level of the index output signal is then found to be low, the content of the flag memory area FL5 is checked in STEP 11. If storage of data "1" in the flag memory area FL5 is detected, the index check subroutine is ended. If storage of data "0" in the memory area FL5 is detected, the CPU 100 triggers the timer circuit 120 after writing data "1" in the memory area FL5. Thereafter, the content of the flag memory area FL7 is checked in STEP 12. If storage of data "1" in the memory area FL7 is detected, the CPU 100 writes data "1" in the flage memory area FL8, stops the generation of the motor drive signal, and clears the content of the flag memory area FL1. Thus, the index check subroutine is ended.

If storage of data "0" in the flag memory area FL7 is detected in STEP 12, the content of the flag memory area FL6 is checked in STEP 13. If storage of data "1" or "0" in the memory area FL6 is detected in STEP 13, the CPU 100 writes data "1" in the memory area FL7 or FL6. Thus, the index check subroutine is ended.

If generation of a high-level index output signal from the index sensor 108 is detected in STEP 10, the CPU 100 checks the content of the flag memory area FL6 in STEP 14. If storage of data "1" in the memory area FL5 is detected, the CPU 100 clears the content of the memory area FL5, and then checks the content of the flag memory area FL8. If storage of data "0" in the memory area FL8 is detected, the CPU 100 generates a motor drive signal, and writes data "1" in the flag memory area FL1. Thus, the index check subroutine is ended. If storage of data "0" in the memory area FL5 is detected in STEP 14, or if storage of data "1" in the memory area FL8 is detected in STEP 15, then the CPU 100 puts an end to the index check subroutine.

In the initial state, the contents of the flag memory areas FL1 and FL5 to FL8 are all "0". If the index check subroutine is thereafter executed at least once, data "1" is stored in the flag memory areas FL5 and FL6, and the timer circuit 120 is triggered. After the elapse of the predetermined time T, an interruption signal is generated from the timer circuit 120, and the CPU 100 writes data "0" in the memory area FL6. Thereafter, when the floppy disk 4 is set on the spindle 2, storage of data "1" in the memory area FL5 is detected. After clearing the content of the memory area FL5, the CPU 100 supplies a motor drive signal to the motor driver 106 to rotate the motor 6. At the same time, the CPU 100 writes data "1" in the flag memory area FL1. As long as the high-level index output signal is generated from the index sensor 108, each subsequent index check subroutine is accomplished after STEP's 10 and 14 are executed. Thus, when the index hole 4C of the rotating floppy disk 4 is detected, and if generation of a low-level index output signal from the index sensor 108 is detected in STEP 10, the CPU 100 executes STEP 11, writes data "1" in the flag memory area FL5, and then triggers the timer circuit 120. Thereafter, the CPU 100 executes STEP's 12 and 13, and then writes data "1" in the flag memory area FL6. As long as the level of the index output signal is low, the CPU 100 only executes STEP's 10 and 11 without changing the contents of the flag memory areas FL1 and FL5 to FL8 in each subsequent index check subroutine.

If generation of a high-level index output signal from the index sensor 108 is thereafter detected as the floppy disk 4 rotates, the CPU 100 executes STEP 14, and clears the content of the flag memory area FL5. When the index output signal from the index sensor 108 becomes low as the floppy disk 4 rotates further, the CPU 100 writes data "1" in the memory area FL5, triggers the timer circuit 120, and the writes data "1" in the memory area FL7. When the index output signal becomes high as the floppy disk 4 rotates, the CPU 100 clears the content of the memory area FL5 in the same manner as aforesaid. When the index hole 4 is detected as the floppy disk 4 is rotated, "YES" is obtained in STEP 12, since data "1" is currently stored in the memory area FL7. Thus, the CPU 100 stops the generation of the motor drive signal and clears the content of the memory area FL1 after writing data "1" in the memory area FL8. As a result, the rotation of the motor 6 is stopped, and the CPU 100 clears the contents of the flag memory areas FL6 to FL8 in response to an interruption signal from the timer circuit 120 after the elapse of a predetermined time.

For example, if storage of data "0" in the memory area FL6 is detected in STEP 13, and if the floppy disk 4 is removed after data "1" is written in the memory area FL6, then the timer circuit 120 is triggered. After the elapse of a predetermined time, an interruption signal is generated from the timer circuit 120, and the CPU 100 clears the contents of the flag memory areas FL6 to FL8 and stops driving the motor 6.

In this embodiment, the floppy disk 4 is rotated after setting of the floppy disk 4 on the spindle 2 is detected. When the index hole 4C is detected three times, the rotation of the motor 6 is stopped. If the floppy disk 4 is removed, the contents of the flag memory areas FL6 to FL8 are cleared when the counting of the time T by the timer circuit 120 is completed. When the floppy disk 4 is set again on the spindle 2, therefore, the motor 6 is driven under the same conditions as aforesaid.

Although illustrative embodiments of the present invention have been described in detail herein, it is to be understood that the invention is not limited to those precise embodiments. In the embodiment shown in FIG. 11, for example, the CPU 100 stops the rotation of the motor 6 in response to the interrupt signal from the timer circuit 120. However, the rotation stop function need not always be executed.

In the embodiment shown in FIG. 4, moreover, the flip-flops 40-1 and 40-2 may be omitted, or a similar flip-flop or flip-flops may be connected between them.

In the embodiment shown in FIGS. 1 and 2, it is possible to mount a magnetic head on that portion of the press member 18 which abuts the floppy disk 4. This permits data to be recorded on either side of the floppy disk 4.

What is claimed is:

1. A floppy disk drive apparatus comprising:
   index hole sensing means for detecting an index hole of a flopy disk and generating an index signal;
   a disk holding member for holding the floppy disk;
   drive means for rotating the disk holding member; and
   control means for supplying a drive signal to the drive means in response to an output signal from the index hole sensing means whose signal level is different from that of the index signal.

2. A floppy disk drive apparatus according to claim 1, which further comprises control signal generating means for supplying a drive signal to the drive means, and in which said control means includes a logic circuit for supplying the drive signal to the drive means in response to the output signal of said different signal level from the index hole sensing means and the output signal of the control signal generating means.

3. A floppy disk drive apparatus according to claim 2, wherein said control means includes a drive signal generating circuit for supplying the drive signal to the drive means in response to the output signal of said different signal level from the index hole sensing means, and a control circuit inhibiting the drive signal from being supplied from the drive signal generating circuit to the drive means (6, 36) in response to the index signal from the index hole sensing means.

4. A floppy disk drive apparatus according to claim 3, wherein said control circuit is a counter circuit whereby an index signal from the index hole sensing means is counted, and an inhibit signal is supplied to the drive means when a predetermined count value is obtained.

5. A floppy disk drive apparatus according to claim 4, wherein said counter circuit is formed of cascade-connected flip-flops.

6. A floppy disk drive apparatus according to claim 4, which further comprises a timer circuit adapted to be triggered in response to the index signal from the index hole sensing means and to supply a reset signal to the counter circuit when a time longer than the time required for one rotation of the floppy disk is elapsed before said timer circuit is re-triggered, thereby resetting the counter circuit to an initial state.

7. A floppy disk drive apparatus according to claim 6, which further comprises a logic circuit for inhibiting, in response to the reset signal from the timer circuit, the drive signal from the drive signal generating circuit from being supplied to the drive means.

8. A floppy disk drive apparatus according to claim 1, which further comprises a control signal generating means for generating a motor control signal, and in which said control means includes a data processing circuit and memory means for supplying the drive signal to the drive means in response to the output signal of said different a signal level from the index hole sensing means and the output signal from the control signal generating circuit.

9. A floppy disk drive apparatus according to claim 8, wherein said memory means has a first memory area, and said data processing circuit is adapted to write drive inhibit data in the first memory area of the memory area of the memory means and stop the supply of the drive signal to the drive means in response to the index signal from the index hole sensing means.

10. A floppy disk drive apparatus according to claim 8, wherein said memory means has a first memory area, and said data processing circuit is adapted to write inhibit data in the first memory area of the memory means when the index signal from the index hole sensing means is detected a predetermined number of times, and to stop the supply of the drive signal to the drive means in response to the index signal from the index hole sensing means while writing the inhibit data in the first memory area.

11. A floppy disk drive aparatus according to claim 10, wherein said memory means further has a second memory area for storing data representing the frequency of generation of the index signal from the index hole sensing means, and said data processing circuit generates a trigger signal in response to the index signal from the index hole sensing means, and said control means further includes a timer circuit adapted to be triggered in response to the trigger signal from the data processing circuit and to supply an interrupt signal to the data processing circuit after the passage of a predetermined time before the supply of a subsequent trigger signal, thereby clearing the contents of the first and second memory areas.

12. A floppy disk drive apparatus according to claim 1, wherein said control means includes a drive signal generating circuit for supplying the drive signal to the drive means in response to the output signal of said different signal level from the index hole sensing means, and a control circuit for inhibiting the dive signal from being supplied from the drive signal generating circuit to the drive means in response to the index signal from the index hole sensing means.

* * * * *